Patented Feb. 5, 1924.

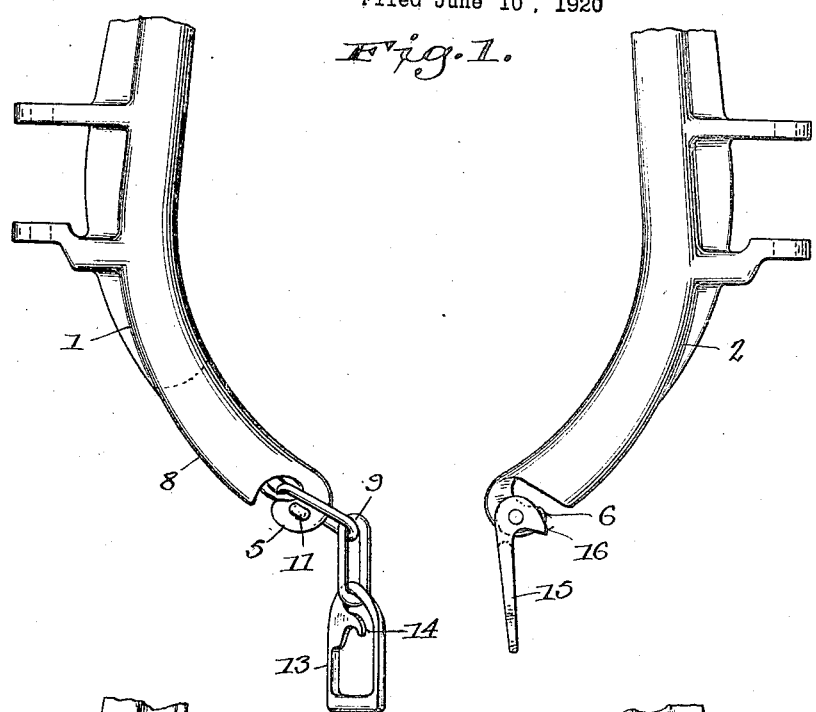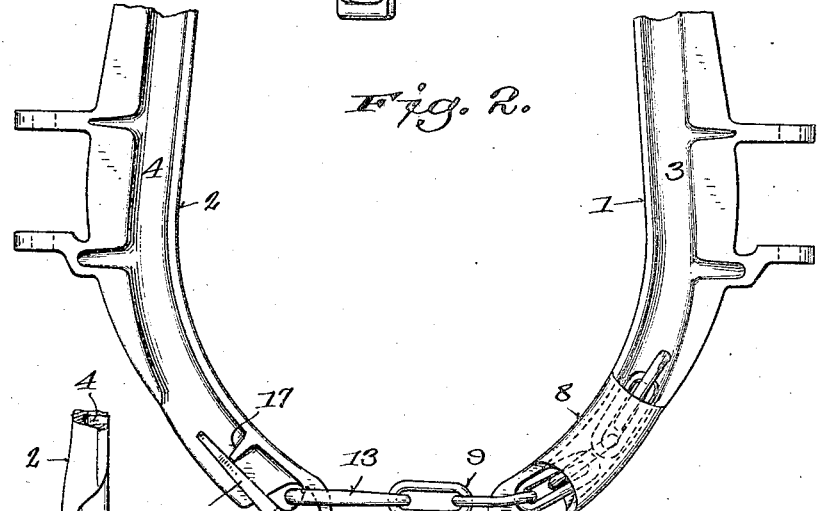

1,482,668

UNITED STATES PATENT OFFICE.

JAMES M. WALSH, OF MILWAUKEE, WISCONSIN, ASSIGNOR TO WALSH HARNESS COMPANY, OF WILMINGTON, DELAWARE, A CORPORATION OF DELAWARE.

HAME.

Application filed June 10, 1920. Serial No. 387,932.

*To all whom it may concern:*

Be it known that I, JAMES M. WALSH, a citizen of the United States, residing at Milwaukee, in the county of Milwaukee and State of Wisconsin, have invented certain new and useful Improvements in Hames, of which the following is a specification, reference being had to the accompanying drawing, forming a part thereof.

This invention relates more particularly to the construction of the lower ends of hames and means for detachably and adjustably connecting them, being an improvement on hames and fastenings of the class shown and described in United States Letters Patent No. 1,358,348, dated November 9, 1920.

The main objects of the present invention are to confine and conceal the surplus length of chain used in the adjustable fastening, to avoid loose, rattling and unsightly ends or parts of the fastening; to facilitate the adjustment and application of the hames to collars of different sizes and their removal therefrom; to do away with the objectionable strap and buckle fastening commonly used; and generally to simplify and improve the construction and operation of devices of this class.

It consists in the construction, arrangement and combination of parts as hereinafter particularly described and pointed out in the claims.

In the accompanying drawing like characters designate the same parts in the several figures.

Figure 1 is a front elevation of the lower portions of a pair of hames with the fastening at their lower ends disconnected; Fig. 2 is a back elevation of like portions of the hames showing the fastening connected; and Fig. 3 is an outer side elevation of the hook lever forming part of the fastening, and the end of the hame to which it is pivoted.

The hames 1 and 2, which are preferably made of malleable iron, are formed in the back, as shown in Fig. 2, with longitudinal channels 3 and 4, and terminate at their lower ends in downwardly and outwardly directed hooks 5 and 6.

The hame 1 is formed adjacent the hook 5 at its lower end with a tubular housing 8, which may be made of greater or less length as desired, to receive and confine the surplus length of a chain 9, for adjustably connecting the lower ends of the hames, as hereinafter explained.

The chain 9 comprises a series of like or similar links, any of which is engageable with the hook 5 on the hame 1 for varying the effective length of the chain connecting the two hames to fit collars of different sizes, the surplus length of chain being tucked into and confined in the tubular housing 8, as shown in Fig. 2, and thus concealed and prevented from rattling when the hames are placed in position on a collar. The hook 5 may be provided with a cotter pin 11 or other fastening, to prevent accidental disengagement of the chain therefrom.

The chain is provided with a terminal link 13, adapted for detachable engagement with the hook 6 on the hame 2, and for adjustable articulation with the adjoining link of the chain. For adjustable articulation with the adjoining link, the link 13 is formed as shown in Fig. 1, with an inwardly projecting hook or seat 14, with which, or with the end of the link, the adjoining link of the chain is selectively engageable, for varying the effective length of the chain connecting the hames, and affording a closer adjustment than is obtained by the engagement of different links of the chain with the hook 5.

A lever 15, pivoted adjacent one end thereof to the hook 6 on the hame 2, is formed with a reversely directed hook 16, the bight of which approximately coincides with the bight of the channel hook when the lever is turned up into the channel 4 against a stop 17 therein, as shown in Fig. 2, the channel being open on the lower side of the hame below the stop and adjacent the hook 6. The end of the lever 15 opposite the hook 6 extends upwardly beyond the stop 17, which holds it away from the inner or upper wall of the hame when the lever is closed, as shown in Fig. 2, so that it can be easily reached and grasped with a finger for opening the lever and disengaging the chain from the hook 6.

As shown in Fig. 3, the lever hook 16 is preferably cleft or forked to fit over and embrace the hame hook 6, and the end opposite the hook is preferably flattened or extended transversely to provide a more convenient and effective finger hold for operating the lever.

To apply the hames to a collar, the fastening being adjusted to fit or approximately fit the collar by engagement of the proper link of the chain 9 with the hook 5 and the hames being placed in postion on the collar, the link 13 is carred upwardly around the lever 15 when it is turned down, as shown in Fig. 1, and the lever is then turned upwardly into the channel 4 against the stop 17, as shown in Fig. 2, thereby forcing the cross bar of the link 13 into the bight of the hook 6 and drawing the lower ends of the hames together and fastening them in place on the collar.

In case the hames do not snugly fit the collar with the closest adjustment that can be made by the engagement of any particular link of the chain with the hook 5 when the end of the link 13 is engaged with the adjoining link of the chain, the hook or seat 14 is engaged with the adjoining link, thereby shortening the effective length of the chain about one-half the length of one of its intermediate links, so that when the fastening is connected with both hames, as shown in Fig. 2, they will be drawn tightly into place on the collar and the strain to which the chain is thereby subjected will securely hold the lever 15 in place against the stop 17 and prevent accidental disengagement of the fastening from the hook 6 of the hame 2.

The handle end of the lever 15 closing into the channel 4 of the hame 2, as shown in Fig. 2, is thereby protected and prevented from being caught and accidentally opened.

The fastening is easily and quickly disconnected from the hame 2 for removing the hames from the collar, by inserting a finger into the channel 4 between the collar and the front or outer wall of the hame, grasping the end of the lever adjacent the stop 17, and pulling it downward into the position shown in Fig. 1, thereby forcing the cross bar of the link 13 off from the hook 6.

When the fastening is properly adjusted and the hames applied to and secured in place on a collar as above explained, the surplus length of the chain confined in the housing 8 is concealed and prevented from rattling, and no parts of the fastening are left exposed or loose, to rattle, wear or mar the appearance of the hames.

The hames as above explained, can be easily and quickly adjusted to fit collars of different sizes, and readily applied to and removed therefrom.

Various modifications in details of construction and arrangement of parts may be made without departure from the principle and scope of the invention as defined in the following claims.

I claim:

1. The combination of hames one of which is provided at its lower end with a tubular housing, a chain, means for detachably connecting one end of the chain with the lower end of the other hame, and means accessible from the outside when the hames are placed on a collar for connecting the chain by any of a series of its links with the first hame adjacent the lower end of the housing into which the surplus length of the chain is adapted to be tucked and in which it is confined.

2. The combination of hames one of which is provided at its lower end with a downwardly directed hook and formed adjacent the hook with a longitudinal channel open on the under side and a stop within the channel, a lever pivoted to the hame hook and having an upwardly directed hook approximately coinciding with the hame hook when the lever is turned upwardly into said channel against the stop therein, the free end of the lever when closed extending beyond the stop and held thereby away from the inner wall of the channel, and a chain releasably engageable at one end with said hooks and adjustably connected with the lower end of the other hame, the pull of the chain on the lever hook when the hames are drawn together by the chain securely holding the lever against the stop with the free end of the lever completely within and protected by the sides of the channel.

3. The combination of hames one of which is provided at its lower end with a downwardly directed hook, a lever pivoted to the hame hook and having a reversely directed hook approximately coinciding with the hame hook when the lever is turned upwardly against the hame, and a chain connected with the lower end of the other hame and comprising a number of loosely articulated links including a terminal link releasably engageable with said hooks and adjustably articulated with the adjoining link of the chain for varying the length of the connection between the hames.

4. The combination of hames one of which is provided at its lower end with a hook, a lever pivoted to the hame hook and having a reversely turned terminal hook, and a chain connected with the lower end of the other hame and having a link releasably engageable at one end with said hooks and provided between its ends with a seat, said seat and the chain end of said link providing means for selective engagement with the adjoining link of the chain.

5. The combination of hames one of which is formed at its lower end with a hook and adjacent the hook with a tubular housing, a chain engageable by any of a series of its links with said hook, the surplus length of chain being tucked into and confined in said housing, and means for detachably connecting the chain with the lower end of the other hame.

6. The combination of hames provided with hooks at their lower ends, one hame being formed in the back with a longitudinal downwardly opening channel and a stop within the channel and the other hame being formed adjacent its hook with a longitudinal tubular housing, a lever pivoted to the hook of the first hame and formed with a reversely directed hook approximately coinciding with the hame hook when the lever is turned up into the channel against the stop therein, and a chain having a terminal link releasably engageable with the lever hook and the hame hook to which the lever is pivoted, any of a series of links of the chain being engageable with the hook of the other hame, and the surplus length of chain being adapted to be tucked into and confined in said housing.

In witness whereof I hereto affix my signature.

JAMES M. WALSH.